United States Patent [19]

Drumm

[11] Patent Number: 4,872,689
[45] Date of Patent: Oct. 10, 1989

[54] MECHANICAL SEAL WITH HEAT EXCHANGER
[75] Inventor: Kevin R. Drumm, Markham, Canada
[73] Assignee: Nuraseal Co. Ltd., Canada
[21] Appl. No.: 41,144
[22] Filed: Apr. 22, 1987
[30] Foreign Application Priority Data
Dec. 12, 1986 [CA] Canada .................................. 525130
[51] Int. Cl.[4] .......................... F16J 15/34; F16J 15/54; F28F 1/42
[52] U.S. Cl. ...................................... 277/9.5; 165/179; 277/22; 277/81 R
[58] Field of Search .................... 277/22, 32, 81 R, 85, 277/87, 93 SD, 9.5; 165/179

[56] References Cited
U.S. PATENT DOCUMENTS

| 2,223,519 | 12/1940 | Hornschuch | 277/22 |
| 2,257,011 | 9/1941 | Hillier | 277/22 |
| 2,362,571 | 11/1944 | McCollum | 165/179 X |
| 2,628,852 | 2/1953 | Voytech | 277/22 X |
| 3,213,798 | 10/1965 | Carswell . | |
| 3,259,391 | 7/1966 | Csillag . | |
| 3,847,212 | 11/1974 | Withers, Jr. et al. | 165/179 |
| 3,889,960 | 6/1975 | Wiese . | |
| 4,109,920 | 8/1978 | Wiese . | |
| 4,114,899 | 9/1978 | Kulzer et al. | 277/22 |
| 4,465,427 | 8/1984 | Libertini et al. . | |
| 4,538,821 | 9/1985 | Wallace | 277/81 R |
| 4,560,173 | 12/1985 | Adams et al. . | |
| 4,586,718 | 5/1986 | Stephenson et al. . | |

FOREIGN PATENT DOCUMENTS

| 177068 | 5/1953 | Austria | 165/179 |
| 293203 | 9/1929 | Canada . | |
| 482656 | 4/1952 | Canada . | |
| 654978 | 1/1963 | Canada . | |
| 656112 | 1/1963 | Canada . | |
| 689315 | 6/1964 | Canada . | |
| 704330 | 2/1965 | Canada . | |
| 736248 | 6/1966 | Canada . | |
| 908683 | 8/1972 | Canada . | |
| 986153 | 3/1976 | Canada . | |
| 1072595 | 2/1980 | Canada . | |

OTHER PUBLICATIONS

Seven page presentation entitled "Advanstech Transtherm Cartridge Mechanical Seal" (undated).

Primary Examiner—Allan N. Shoap
Attorney, Agent, or Firm—Howson & Howson

[57] ABSTRACT

The present invention is particularly concerned with rotary end face seals of the type including a pair of annular sealing members disposed in relatively rotatable sealing proximity about a rotation axis. Each of these annular members typically includes a radially arranged annular sealing surface with these sealing surfaces being in face-to-face sealing proximity with one another during use so as to define a radially arranged annular sealing interface which separates a region of higher pressure from a region of lower fluid pressure. The invention particularly provides an annular heat exchanger which, in use, surrounds the annular sealing members in radially spaced relation thereto to define, within one of the above-noted regions, an annular zone of fluid pressure between the heat exchanger and the sealing members. The heat exchanger acts to transmit heat energy into or out of the above-noted annular zone thereby to affect the temperature of the fluid in such zone during use and hence affect the operating temperatures of the sealing members and the interface temperature to achieve greater sealing efficiency and/or longer seal life.

13 Claims, 2 Drawing Sheets

4,872,689

MECHANICAL SEAL WITH HEAT EXCHANGER

BACKGROUND OF THE INVENTION

This invention relates to mechanical seals and in particular to heat exchangers for use in combination with such seals.

In general, it is well known to modify the temperature of certain components of a mechanical seal in order to provide a more efficient operation of the seal and/or longer seal life. Mechanical seals generate heat at the seal faces. It is also well known that the stability of the fluid film between the seal faces is critical for the satisfactory operation of the seal. The prevailing fluid film temperatures depend on the heat generated, the latter being a function of sealed pressure, shaft speed and coefficient of friction, and the heat dissipation properties of the seal including the heat transfer properties of the sealed fluid. Under certain conditions it may be necessary to introduce cooling to reduce the temperatures existing at the sealed faces. In other situations, as in the sealing of very heavy and viscous materials, it may be necessary to introduce a certain amount of heating thereby to achieve satisfactory conditions at the seal faces.

Many such thermosensitive fluids can have detrimental effects on other seal components, if temperatures are not closely controlled. Also, temperature limitations of secondary sealing components (eg. O-rings) can be exceeded resulting in premature failure.

Several traditional methods have been utilized in the past to modify the temperature of the seal chamber and/or mechanical seal components in an effort to ensure successful operation of the seal.

The first of these traditional methods involves the use of a jacket on the equipment's stuffing box to enable the circulation of a suitable heat exchange medium. These arrangements have a number of disadvantages. When considering the case of cooling, one must cool almost the whole casing, i.e. heat must be drawn away from the whole area. This requires a relatively large volume of coolant, and is consequently not very cost-effective or efficient.

Another method involves recirculation of the fluid being sealed through an external heat exchanger and back into the seal chamber. For example, fluid from the discharge side of a pump is used and this higher pressure fluid is injected into the seal chamber to prevent flashing at the seal faces. The combined effect of cooling the pumpage and increasing the sealed pressure often serves to prevent flashing in the sea interface. However, the increased pressure acts to increase the seal face closing force and this in turn increases the heat generated at the seal faces. Hence, the system has a built-in measure of inefficiency. Moreover, abrasive materials in the pumpage fluid may be forced into the sealing area. Also, an external heat exchanger is both expensive and relatively inefficient since it too often requires large volumes of heat exchange medium.

Another method involves the use of buffer fluid systems between double seals or quench and drain systems on the atmospheric side of a single seal. In the case of a buffer fluid, a heat exchange medium, separate from the fluid being pumped, is directed into the area between the two seals. The means for pumping or supplying this barrier fluid gives rise to additional expense. Even with double seal arrangements and a barrier fluid, the hot pumpage at the seal interface can give rise to flashing and dry seal faces. If the barrier fluid pressure is made sufficiently high as to avoid this problem, then relatively costly pumping equipment is needed. Another drawback is that one cannot readily detect inboard seal leakage with this system. Also, it too is relatively inefficient, requiring large volumes of heat exchange media either through the seal to the drain (in a "once-through" system) or through a coil in the convection tank (in a recirculating or "thermosiphon" closed-Loop system).

Another arrangement involves the use of a jacketed gland or a jacketed stationary seat designed to permit circulation of a heat transfer medium. Again, difficulties are encountered in that a relatively large gland plate must be heated or cooled before any cooling effect at the seal faces can be achieved. Furthermore, the design is such that there is a very lengthy heat transfer path from the jacketed gland to the seal interface. It is solely by means of conductive heat transfer through the stationary seal face and holder and/or gland plate that any cooling is effected. Since it has been shown that the greater percentage of heat dissipation (80 to 90 percent) naturally occurs through the rotating face, this points to another shortcoming of designs of this type. The result is that very large flow rates for the heat transfer media are required to effect any reasonable change in temperature at the seal faces. This technique also requires a fairly special design which cannot be applied easily to every situation.

Another variation involves simple recirculation of pumpage but without the use of an auxiliary heat exchanger. Thus, no cooling is effected; rather, at best, some percentage of the heat generated at the seal interface is dissipated. This technique again has most of the disadvantages associated with the second technique noted above.

It can be seen from the above that there is therefore a need for a very simple yet effective means for effecting heating or cooling at the seal faces and which means is applicable to a wide variety of seal designs.

SUMMARY OF THE INVENTION

The present invention is particularly concerned with rotary end face seals of the type including a pair of annular sealing members disposed in relatively rotatable sealing proximity about a rotation axis. Each of these annular members typically includes a radially arranged annular sealing surface with these sealing surfaces being in face-to-face sealing proximity with one another during use so as to define a radially arranged annular sealing interface which separates a region of higher pressure from a region of lower fluid pressure. The invention particularly provides an annular heat exchanger which, in use, surrounds the annular sealing members in radially spaced relation thereto to define, within one of the above-noted regions, an annular zone of fluid pressure between the heat exchanger and the sealing members. The heat exchanger acts to transmit heat energy into or out of the above-noted annular zone thereby to affect the temperature of the fluid in such zone during use and hence affect the operating temperatures of the sealing members and the interface temperature to achieve greater sealing efficiency and/or longer seal life.

Preferably, the heat exchanger extends in the axial direction to axial positions spaced apart on opposing sides of the axial position of the sealing interface so that at least substantial parts of the axial extent of both of the annular sealing members are exposed to the annular zone of fluid pressure. Stated differently, the annular heat exchanger is of sufficient axial extent as to embrace at least a major part of both of the annular sealing members.

Preferably, the radial dimension of the annular zone between the heat exchanger and the sealing members is small in relation to the outside diameters of the sealing members thereby to minimize or inhibit movement or flow of fluid into and out of the annular zone.

The heat exchanger preferably comprises a hollow annular body having a fluid inlet and a fluid outlet for passage of a heat transfer medium therethrough.

The hollow body of the heat exchanger typically comprises inner and outer radially spaced apart cylindrical walls joined by opposed end walls. The inner wall has annular ribs extending therearound on both of its opposing major surfaces to provide enhanced heat transfer while at the same time assisting in inhibiting the flow of fluid into and out of the annular zone by virtue of the labyrinth effect provided by the annular ribs. Such ribs also increase the strength of this component which is of importance especially when containing fluids at relatively high pressures.

In a typical embodiment, the heat exchanger may include a suitable flange for mounting and/or centering same on a gland plate of the seal. In certain designs, the heat exchanger may be provided with an annular recess for receiving or mounting one of the annular sealing members.

DETAILED DESCRIPTION OF THE PREFERRED EMBODIMENT

Figure 1:
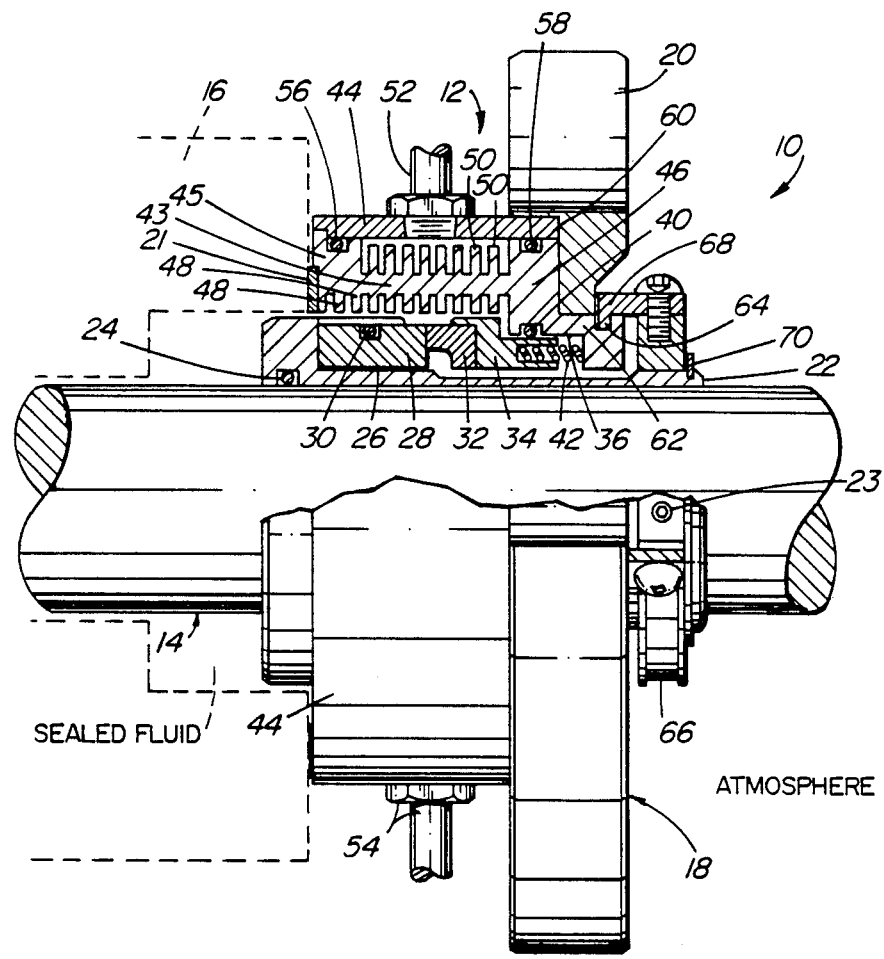
FIG. 1 is a side elevation view, partly in section, of a shaft mounted rotary end face seal incorporating a heat exchanger in accordance with an embodiment of the present invention.
Figure 2:
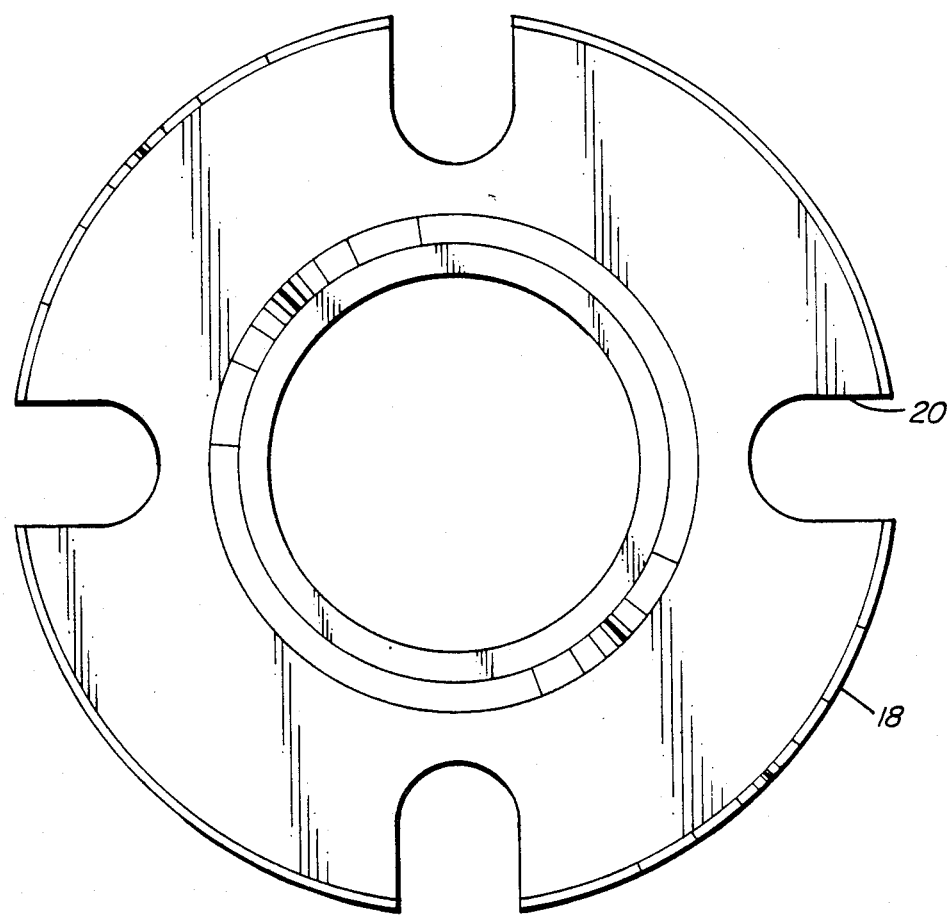
FIG. 2 is an end view of a gland plate per se

With reference now to the drawing there is shown a rotary end face seal assembly 10 which includes a heat exchanger 12 in accordance with the teachings of the present invention. The seal 10 is illustrated as being mounted on a shaft 14, the left hand end of shaft 14, as seen in the drawing, extending into the interior of a machine housing 16. In order to secure the seal assembly including the heat exchanger 12 to the housing 16, a circular gland plate 18 is provided, the same being provided with a plurality of bolt slots, extending inwardly from the periphery of gland plate 18, as shown in FIG. 2, wherein one of the bolt slots is indicated at 20. Bolts (not shown) may be passed through these bolt slots thereby to firmly secure the entire assembly to the housing 16. An annular gasket 21 interposed between heat exchanger 12 and housing 16 prevents leakage of the contained fluids.

The seal assembly includes a pair of annular seal rings disposed in relatively rotatable sealing proximity about the axis of the shaft 14. The rotary seal ring assembly includes an elongated seal sleeve 22 which extends around the shaft 14 and which, in use, is locked for rotation therewith by means of a plurality of set screws 23 positioned adjacent the outer end of the sleeve. In order to prevent leakage of fluid between the sleeve 22 and shaft 14, an O-ring seal 24 is provided located in an annular recess adjacent the inner end of sleeve 22. This inner end of sleeve 22 is also provided with an enlarged annular pocket or recess 26. This annular recess 26 receives a rotating seal ring 28, such seal ring 28 being preferably made from a very hard, long wearing and thermally conductive material such as silicon-carbide. A further O-ring 30 located in a groove within the seal ring prevents leakage of fluid between the seal ring 28 and the sleeve 22.

The opposing stationary seal ring assembly comprises a seal ring 32 which is made of a softer material such as carbon graphite. This seal ring is mounted in known fashion in an annular metal seal ring holder 34. Seal ring holder 34 in turn is disposed within an annular recess 36 which is defined in an end portion of the heat exchanger 12 to be hereinafter described. A further O-ring 40 within recess 36 engages a portion of the seal ring holder 34 to prevent leakage of fluids thereby. The seal ring holder is provided with a number of small axially extending holes each of which receives a coil compression spring 42, these coil compression springs serving to urge the seal ring holder 34 and attached seal ring 32 against the face of the rotary seal ring 28. A plurality of axial pins, not shown, co-operate in known manner between recess 36 and seal ring holder 34 to prevent rotation of the latter while allowing limited movement thereof in the axial direction.

The rotary seal ring 28 and the stationary seal ring 32 are in face-to-face sealing proximity during use along a radially arranged annular sealing interface. They serve to separate a region of higher fluid pressure from a region of lower fluid pressure. The region of lower fluid pressure, i.e. atmospheric pressure, is disposed radially inwardly of the annular sealing interface while the zone of higher fluid pressure is disposed outwardly thereof.

The above-noted heat exchanger 12 is of annular configuration and it completely surrounds the rotary seal ring 28 as well as the stationary seal ring 32 and its holder. The heat exchanger is in radially spaced relation thereto such that an annular zone of fluid pressure is defined between the heat exchanger 12 and the sealing rings 28, 32. The function of the heat exchanger 12 is to transmit heat energy into or out of this annular zone thereby to affect the temperature of the fluid in such zone during use and thus affect the operating temperatures at the interface of the seal rings 28 and 32 during use.

It will be noted that the heat exchanger 12 extends in the axial direction to axial positions which are spaced well apart on opposing sides of the axial position of the sealing interface defined between seal rings 28 and 32 so that both of the seal rings 28 and 32 are exposed to the above-noted annular zone which exists between their outer surfaces and the interior surface of the heat exchanger 12.

As also shown in the drawing, the radial dimension of the annular zone between the heat exchanger 12 and the sealing rings 28, 32 and their holders is relatively small in relation to the outside diameters of the sealing rings thus minimizing movement or flow of the fluid being sealed into and out of such annular zone. In a typical embodiment wherein the outside diameter of the seal rings is in the order of two inches, the radial gap between the seal ring holders and the inner surfaces of the heat exchanger is only about 25 thousandths of an inch. Although this dimension is not particularly critical, it should be kept as small as is practical thereby to reduce ingress of fluid and thus minimize the volume of fluid to be heated or cooled within this annular zone.

The heat exchanger 12, as clearly shown, is in the form of a hollow body which includes inner and outer radially spaced cylindrical walls 43 and 44 joined by end wall portions 45 and 46. The inner wall 43 is provided with a series of annular ribs 48 and 50 extending therearound on both of its opposing major surfaces to provide enhanced heat transfer. At the same time, the inner annular ribs 48 assist in inhibiting flow of fluid into and out of the above-noted annular zone by virtue of the labyrinth effect provided by such ribs. It is also believed that this labyrinth effect reduces the effect of pressure surges in the contained fluid on seal face pressures. Also, such ribs serve to strengthen this component eliminating the danger of deformation when containing relatively high pressures. The heat exchanger includes an inlet 52 for admitting the heat exchange medium into the interior of the hollow body and an outlet 54 for releasing such heat transfer medium. In the usual case where cooling of the seal rings is desired, the heat exchange medium is commonly cool water supplied at the usual line pressures in the order of 50 to 80 pounds per square inch via, for example, ¼ inch diameter inlet and outlet pipes.

The heat exchanger outer cylindrical wall 44 is sealingly engaged with the remaining portions of the heat exchanger by way of O-ring seals 56, 58. This outer wall 44 may readily be slid endwise outwardly off the remainder of the heat exchanger body in the axial direction after disassembly thereby to provide for inspection and cleaning of the interior of the heat exchanger.

The spacing and depth of fins 48 and 50 is not critical but they should be selected so as to provide the maximum heat transfer capability. To further enhance heat transfer capability, the heat exchanger should be made of a material having a relatively high heat transfer coefficient. One such material is bronze although in certain cases where corrosion may be a problem, it may be necessary to use stainless steel or other alloys.

In the embodiment shown, the heat exchanger 12 has its outer end portion disposed and centered by and within an annular recess 60 disposed in the gland plate 10. An axially extending flange portion 62 of the heat exchanger projects axially outwardly of the front end of the assembly and this is provided with an annular groove 64. A locking ring 66 extends around the outer end of the shaft sleeve 22 and a plurality of centering clips 68 are secured by screws to this ring with such clips engaged in the annular groove 64. A snap ring 70 located in the outer end of the shaft sleeve 22 prevents relative axial movement between shaft sleeve 22 and the remainder of the assembly. This assembly temporarily serves to set the axial operating distance and to keep the springs 42 in compression and the seal ring faces in close contacting properly centered relationship during mounting and assembly of the seal assembly on a piece of equipment. After the seal together with its heat exchanger have been installed, and the sleeve 22 locked to the shaft 14 by means of set screws 23, the clips 68 are removed.

By virtue of the use of the heat exchange apparatus described above, seal ring life can be greatly extended since by varying the flow volume and/or the temperature of the heat transfer medium passing through the heat exchanger, the temperatures at the sealing ring interface can be brought toward an optimal condition for the particular service conditions concerned. The principles of the invention are applicable to a wide variety of seal designs, i.e. the particular seal arrangement described above is only one of many with which the heat exchanger can be utilized. By utilizing the principles of the present invention, many of the disadvantages associated with previous methods of cooling or heating seals can be greatly alleviated or eliminated altogether.

I claim:

1. A mechanical seal assembly comprising:
   (a) a pair of annular sealing members disposed in relatively rotatable sealing proximity about a rotation axis;
   (b) each of said members defining a generally radially arranged annular sealing surface, said annular sealing surfaces being in face-to-face sealing proximity with one another during use thereby defining a generally radially arranged annular sealing interface separating a region of higher fluid pressure from a region of lower fluid pressure while allowing relative rotation between said sealing surfaces;
   (c) and an annular heat exchanger surrounding said sealing members in radially spaced relation thereto to define within one of said regions an elongated annular zone located between said heat exchanger and said sealing members with said annular zone, during use, being filled with fluid from one of said regions of fluid pressure, said heat exchanger being capable of acting to transmit heat energy into or out of said annular zone thereby to affect the temperature of the fluid in said annular zone during use and hence the operating temperatures of said sealing members and the temperature at said sealing interface.
   (d) said heat exchanger and said elongated annular zone defined between the heat exchanger and the sealing members extending in the axial direction to axial positions spaced apart sufficiently on opposing sides of the axial position of the sealing interface so that at least substantial parts of the axial extent of both of said annular sealing members are within the axial length of said heat exchanger and in direct heat transfer relation when in use with the fluid within said elongated annular zone, and,
   (e) the radial dimension of the annular zone between said heat exchanger and the sealing members being small in relation to the outside diameters of the sealing members such as to restrict movement or flow of the fluid into and out of said annular zone and thus minimize the volume of fluid to be heated or cooled within said annular zone and wherein
   (f) said heat exchanger comprises an annular hollow body having a fluid inlet and a fluid outlet for passage of a heat transfer medium therethrough, said hollow body comprising inner and outer radially spaced cylindrical walls joined by end walls, said inner wall having a pair of opposed major surfaces and said inner wall having ribs extending therearound on at least that one of its opposing major surfaces which is exposed to said annular zone to provide enhanced heat transfer with fluid in said annular zone while further assisting in inhibiting the flow of fluid into and out of said annular zone by virtue of the labyrinth effect provided by said ribs exposed within said annular zone.

2. A mechanical seal assembly comprising:
   (a) a pair of annular sealing members disposed in relatively rotatable sealing proximity about a rotation axis;

(b) each of said members defining a generally radially arranged annular sealing surface, said annular sealing surfaces being in face-to-face sealing proximity with one another during use thereby defining a generally radially arranged annular sealing interface separating a region of higher fluid pressure from a region of lower fluid pressure while allowing relative rotation between said sealing surfaces;

(c) and an annular heat exchanger surrounding said sealing members in radially spaced relation thereto to define within one of said regions an elongated annular zone located between said heat exchanger and said sealing members with said annular zone, during use, being filled with fluid from one of said regions of fluid pressure, said heat exchanger being capable of acting to transmit heat energy into or out of said annular zone thereby to affect the temperature of the fluid in said annular zone during use and hence the operating temperatures of said sealing members and the temperature at said sealing interface, (d) said heat exchanger and said elongated annular zone defined between the heat exchanger and the sealing members extending in the axial direction to axial positions spaced apart sufficiently on opposing sides of the axial position of the sealing interface so that at least substantial parts of the axial extent of both of said annular sealing members are within the axial length of said heat exchanger and in direct heat transfer relation when in use with the fluid within said elongated annular zone, and, (e) the radial dimension of the annular zone between said heat exchanger and the sealing members being small in relation to the outside diameters of the sealing members such as to restrict movement or flow of the fluid into and out of said annular zone and thus minimize the volume of fluid to be heated or cooled within said annular zone wherein (f) said heat exchanger comprises an annular hollow body adapted for passage of a heat transfer medium therethrough, said mechanical seal assembly including a gland plate for mounting the mechanical seal assembly to a machine casing, and flange means on said heat exchanger for centering and/or mounting the latter to the gland plate.

3. The seal according to claim 2 the heat exchanger further including an annular recess therein for receiving/mounting one of said annular sealing members.

4. The seal according to claim 2 further including temporary securing clips engaged with said flange means to secure the seal assembly together and to center the mechanical seal assembly relative to said rotation axis.

5. A heat exchanger for a seal assembly comprising:
a hollow annular body adapted to be mounted to the seal assembly in surrounding, radially spaced relation to a pair of annular sealing members of the seal assembly to transmit heat energy toward or away from them, fluid inlet and outlet means on said body for passage of heat transfer medium therethrough; said annular body having inner and outer radially spaced cylindrical walls joined by end walls, said radially inner wall having a pair of opposing major surfaces and radially disposed ribs extending therearound on both of said opposing major surfaces to provide enhanced heat transfer while assisting in inhibiting the flow of fluid into and out of an annular zone which exists, in use, between said inner wall of the heat exchanger and the outer surfaces of the annular sealing members.

6. The heat exchanger of claim 5 including flange means for mounting the heat exchanger to a gland plate or mounting plate.

7. The heat exchanger of claim 5 including means for seating and/or sealingly engaging one of the annular seal rings.

8. A heat exchanger for a seal assembly comprising:
a hollow annular body adapted to be mounted to the seal assembly in surrounding, radially spaced relation to a pair of annular sealing members of the seal assembly to transmit heat energy toward or away from them, fluid inlet and outlet means on said body for passage of heat transfer medium therethrough; said annular body having inner and outer radially spaced cylindrical walls joined by end walls, said radially inner wall having a radially innermost major surface and a radially outmost major surface with ribs extending on at least the radially innermost major surface to provide enhanced heat transfer while assisting in inhibiting the flow of fluid into and out of an annular zone which exists, in use, between said radially inner wall of the heat exchanger and the radially outer surfaces of the annular sealing members.

9. The heat exchanger of claim 8 including flange means for mounting same to a gland plate or mounting plate.

10. The heat exchanger of claim 8 including means for seating and/or sealingly engaging one of the annular seal rings.

11. A mechanical seal assembly including a pair of relatively rotatable annular sealing members disposed in sealing proximity to one another around an axis to separate regions of differing fluid pressure, one of said sealing members adapted to be fixed to a shaft for rotation therewith and the other sealing member adapted to remain stationary, and an annular heat exchanger surrounding both said annular sealing members in close radially spaced proximity thereto so as to transfer heat energy into or out of said annular sealing members to heat or cool the same when in use, the annular heat exchanger being of sufficient axial extent as to substantially encompass both of said annular sealing members, the radial spacing between the heat exchanger and the sealing members being small in relation to the outside diameters of the sealing members so as to reduce circulation of fluid from one of said regions of fluid through the radial space between the heat exchanger and said sealing members, said heat exchanger being a hollow body having inlet and outlet means for circulation of heat transfer medium therethrough, said hollow body comprising inner and outer radially spaced cylindrical walls joined by end walls, said inner wall having a pair of opposed major surfaces and said inner wall having radially extending ribs extending therearound on at least that one of its opposing major surfaces which is exposed to said radial space to provide enhanced heat transfer with fluid in said radial space during use while assisting in inhibiting the flow of fluid into and out of said radial space by virtue of the labyrinth effect provided by said ribs which are exposed within said radial space.

12. The mechanical seal assembly of claim 11 including a mounting plate for attaching the mechanical seal assembly to a machine housing, said annular heat exchanger adapted to be clamped between the mounting plate and the machine housing.

13. The mechanical seal assembly of claim 11 wherein said heat exchanger includes a recess therein for receiving the stationary seal ring.

* * * * *

UNITED STATES PATENT AND TRADEMARK OFFICE
CERTIFICATE OF CORRECTION

PATENT NO.   : 4,872,689
DATED        : October 10, 1989
INVENTOR(S)  : Kevin R. Drumm It is certified that error appears in the above-identified patent and that said Letters Patent is hereby corrected as shown below:

At column 1, line 51, change "sea" to --seal--.

At column 6, line 33, change "interface." to --interface,--.

Signed and Sealed this

Twenty-fifth Day of February, 1992

Attest:

HARRY F. MANBECK, JR.

*Attesting Officer*    Commissioner of Patents and Trademarks